United States Patent [19]

Staten et al.

[11] Patent Number: 5,555,839
[45] Date of Patent: Sep. 17, 1996

[54] INFLATABLE BALLOON SIGNAL DEVICE

[75] Inventors: Dwight M. Staten, Hayward, Calif.; Charles M. Staehle, Riviera Beach, Fla.

[73] Assignee: Distress Signals, Inc., Hayward, Calif.

[21] Appl. No.: 470,334

[22] Filed: Jun. 6, 1995

[51] Int. Cl.⁶ .................................................. B64B 1/40
[52] U.S. Cl. ................................... 116/210; 116/209
[58] Field of Search ..................... 116/209, 210; 220/403; 441/80, 88, 92–95, 41

[56] References Cited

U.S. PATENT DOCUMENTS

| | | | |
|---|---|---|---|
| 4,433,638 | 2/1984 | Ashline | 116/210 |
| 4,560,356 | 12/1985 | Burr | 441/80 |
| 4,586,456 | 5/1986 | Forward | 116/210 |
| 4,800,835 | 1/1989 | Mears | 116/210 |
| 4,815,677 | 3/1989 | Rushing et al. | 116/210 |
| 4,932,556 | 6/1990 | Hui et al. | 220/403 |
| 5,020,467 | 6/1991 | Van Patten et al. | 116/210 |
| 5,036,670 | 8/1991 | Morris | 62/6 |
| 5,037,445 | 8/1991 | Sander et al. | 623/66 |
| 5,194,156 | 3/1993 | Tomchak | 210/541 |
| 5,405,479 | 4/1995 | Anderson | 156/308.4 |

*Primary Examiner*—William A. Cuchlinski, Jr.
*Assistant Examiner*—Andrew Hirshfeld
*Attorney, Agent, or Firm*—Carl W. Battle

[57] ABSTRACT

An inflatable balloon signalling device having a container which houses a balloon, a pressure vessel containing a lighter-than-air gas, a gas release actuator assembly, a gas release lever arm, a balloon filler connector and tube, and a rotatable spool carrying a tether line connected to the balloon.

13 Claims, 8 Drawing Sheets

FIG.—1

INFLATABLE BALLOON SIGNAL DEVICE

BACKGROUND OF THE INVENTION

This invention relates generally to signalling devices and in particular to signalling devices using a balloon filled with a lighter-than-air gas.

When a diver or sailor is adrift in rough seas it is difficult for him or her to be seen between swells. Balloon signalling devices of the prior art typically used a lighter-than air gas under pressure to fill a balloon tethered to a line attached to the signalling device. There were many design and operational problems with the devices of the prior art. For example, the inflated balloon of many devices would not maintain altitude in moderate or rough winds. Many devices were relatively heavy, bulky and difficult to operate, and typically could not operate effectively underwater. The devices of the prior art generally were not adapted for use by SCUBA divers or sailors who require a small, portable signalling device that can withstand moderate water pressure when not in use and is simple to operate when in use.

It is an object of the present invention to provide a watertight, tethered balloon signalling device which can withstand moderate water pressure and is operable after SCUBA diving. It is another object of this invention to provide a distress balloon signalling device in which is relatively simple and easy to operate, and which fills the balloon at a rapid and controlled rate and in a relatively short amount of time. It is an even further object of this invention to provide a distress balloon signalling device that is reliable in its operation underwater and in inclement weather. These and other objects of the present invention will become manifest upon review and consideration of the following detailed description when taken together with the drawings.

SUMMARY OF THE INVENTION

The present invention relates to an inflatable balloon signalling device which comprises a relatively small, lightweight container which houses a balloon, a pressure vessel containing a lighter-than-air gas, a gas release actuator assembly, gas release lever arm, a balloon filler connector and tube, and a rotatable spool carrying a tether line connected to the balloon. The balloon features a balloon filler connector member which is connected to the pressure vessel via a balloon filling tube and a gas release actuator assembly. A gas release lever arm is pivotally connected to the gas release actuator assembly and, when rotated about 90 degrees, causes an operating pin to puncture the primary rupture disk. Gas then flows from the pressure vessel through the gas release actuator assembly and balloon filling tube and into the balloon. A balloon release member releasably connects the balloon to the balloon filling tube and the gas release actuator assembly and pressure vessel. The water-tight container is capable of withstanding water pressure usually found during SCUBA diving down to about 130 feet without effect on function or reliability. The container is provided with a quick opening mechanism and removable top cap to provide rapid access to the balloon and gas release actuator assembly and gas release lever arm.

To operate the device, the top sealing cap of the water-tight container is removed to expose the balloon bag, gas release lever arm and the actuator assembly. A lighter-than-air gas is released from the pressure vessel by rotating the gas release lever arm about 90 degrees causing gas to flow through the actuator assembly and into the balloon. When the balloon is filled, the balloon is released from the balloon filling tube. A tether line then unreels off a spool to allow the balloon to rise to a predetermined height above the actuator assembly. The inflated balloon can be detected visually or by radar.

DESCRIPTION OF THE PREFERRED EMBODIMENT

The present invention involves an inflatable balloon signalling device comprising:

a bottom pressure vessel containing a lighter-than air gas under pressure;

a top cap removably connected to said bottom pressure vessel to form a water-tight seal there between, said top cap and bottom pressure vessel in combination forming a pressure-resistant container;

an inflatable balloon bag containing a balloon filler connector, said balloon bag having an airfoil configuration when inflated;

a gas release actuator assembly housed within said pressure resistant container, and having an inlet end connected to said bottom pressure vessel and an outlet end adapted to receive a balloon filling tube, and being in open communication with said balloon bag and said bottom pressure vessel;

a balloon filling tube attached to said outlet end of said gas release actuator assembly and releasably attached to said balloon filler connector via a balloon release member;

a gas release lever arm pivotally connected to said gas release actuator assembly and adapted to release said lighter-than-air gas from said pressure vessel when said gas release lever arm is rotated; and a rotatable spool mounted in proximity to said gas release actuator assembly and having a tether line connected to said rotatable spool and to said balloon bag.

Figure 1:
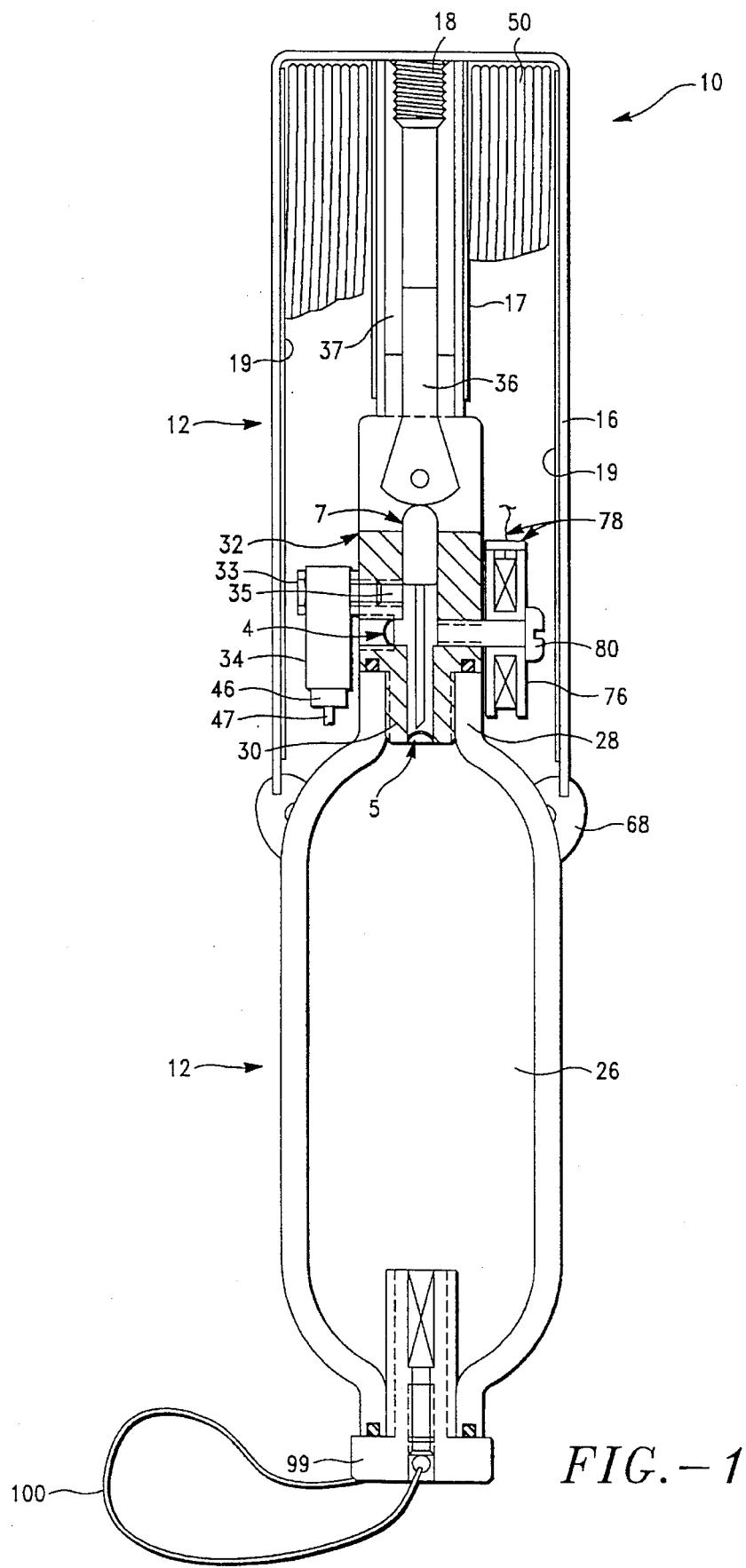
FIG. 1 is a cross-sectional side view of the balloon signalling device of the present invention with the top cap connected to the pressure vessel.

With reference to FIG. 1, a preferred embodiment of the balloon signalling device 10 of the present invention is shown in the pressure resistant container 12. Pressure resistant container 12 comprises a bottom pressure vessel 26 and a top cap 16. The top cap 16 is connected to the bottom pressure vessel 12 via a threaded stud 18.

Figure 2:
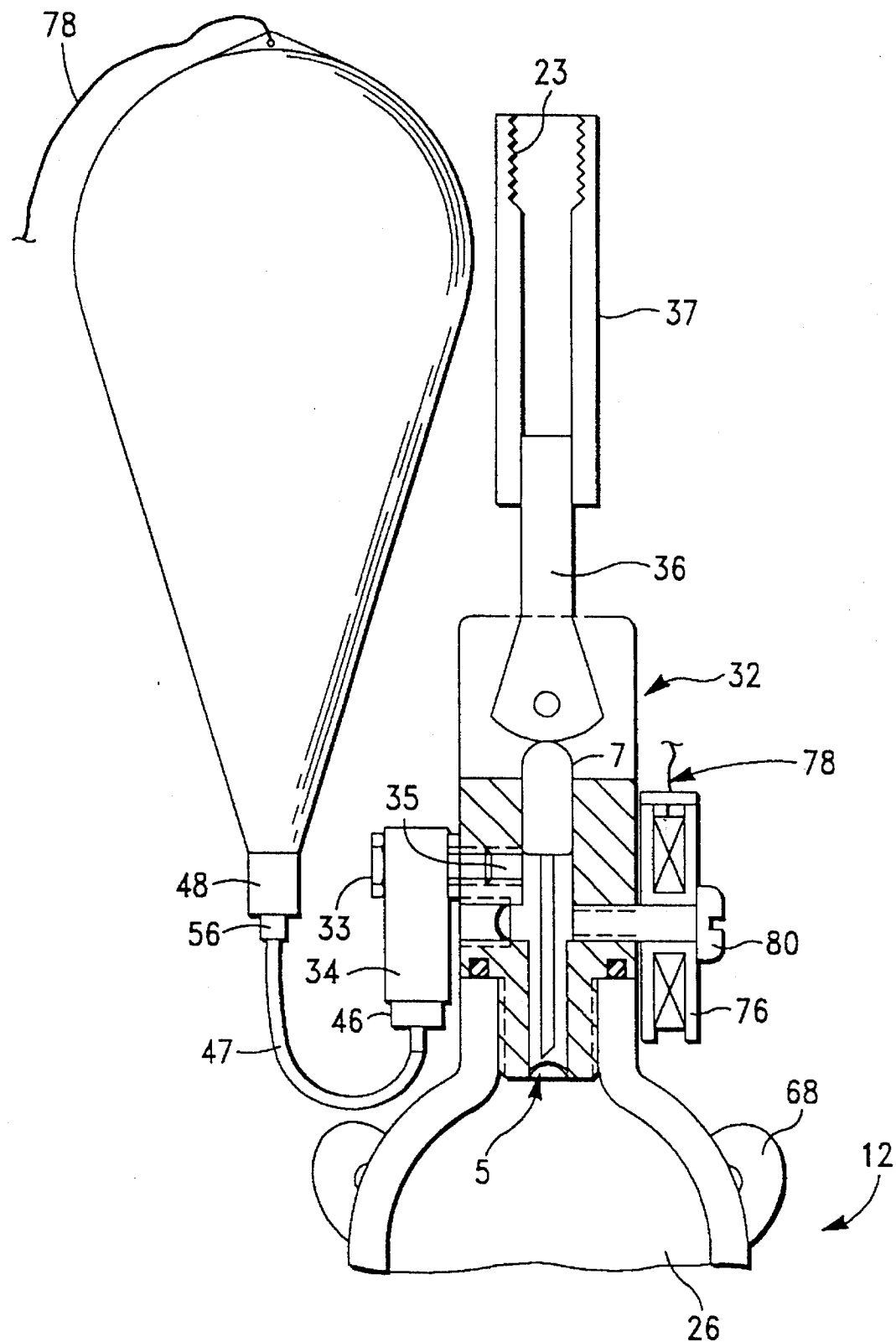
FIG. 2 is a partial cross-sectional side view of the balloon signalling device with top cap removed and balloon unfolded.
Figure 3:
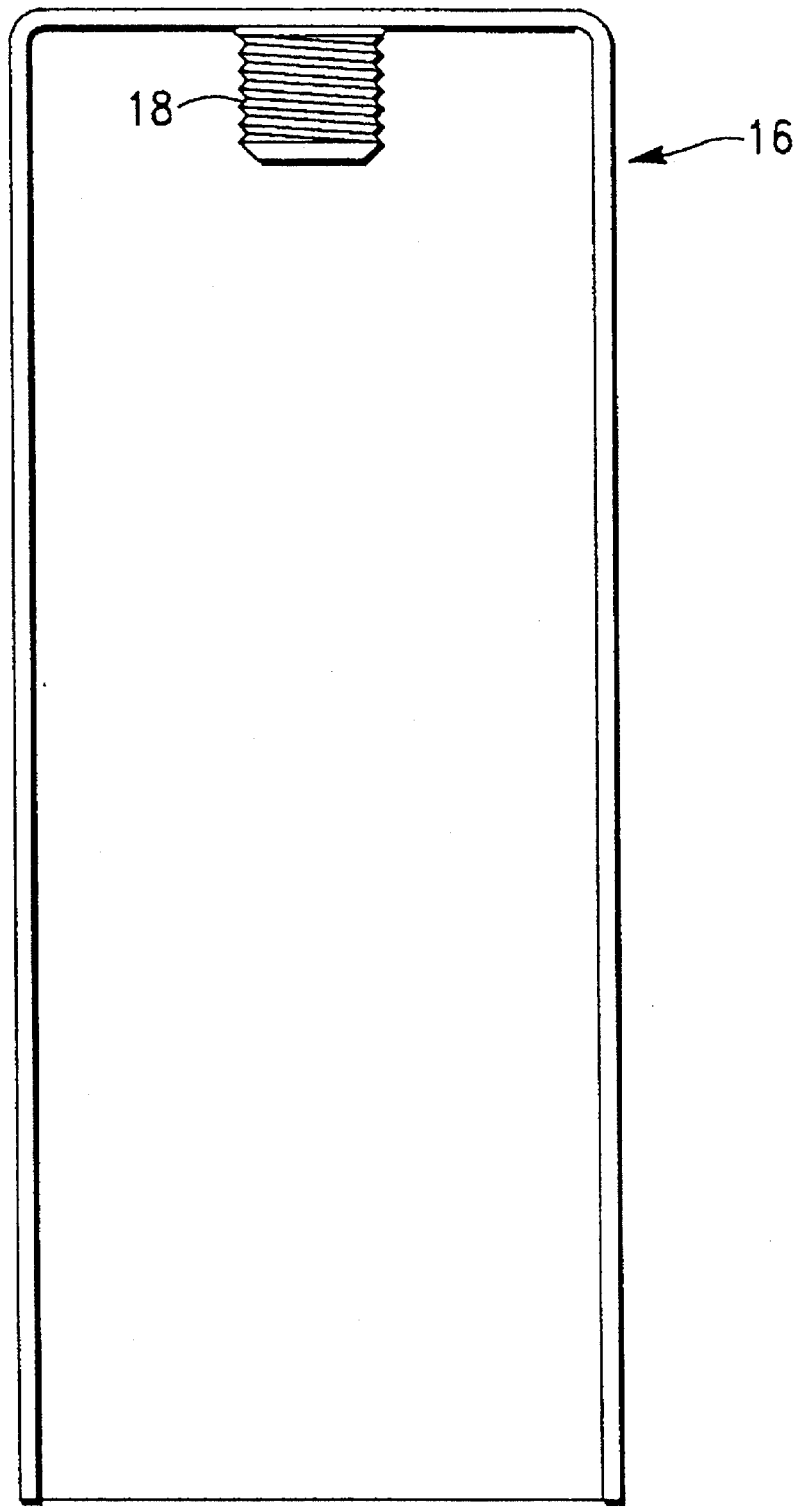
FIG. 3 is a cross-sectional view of the top cap.
Figure 4:
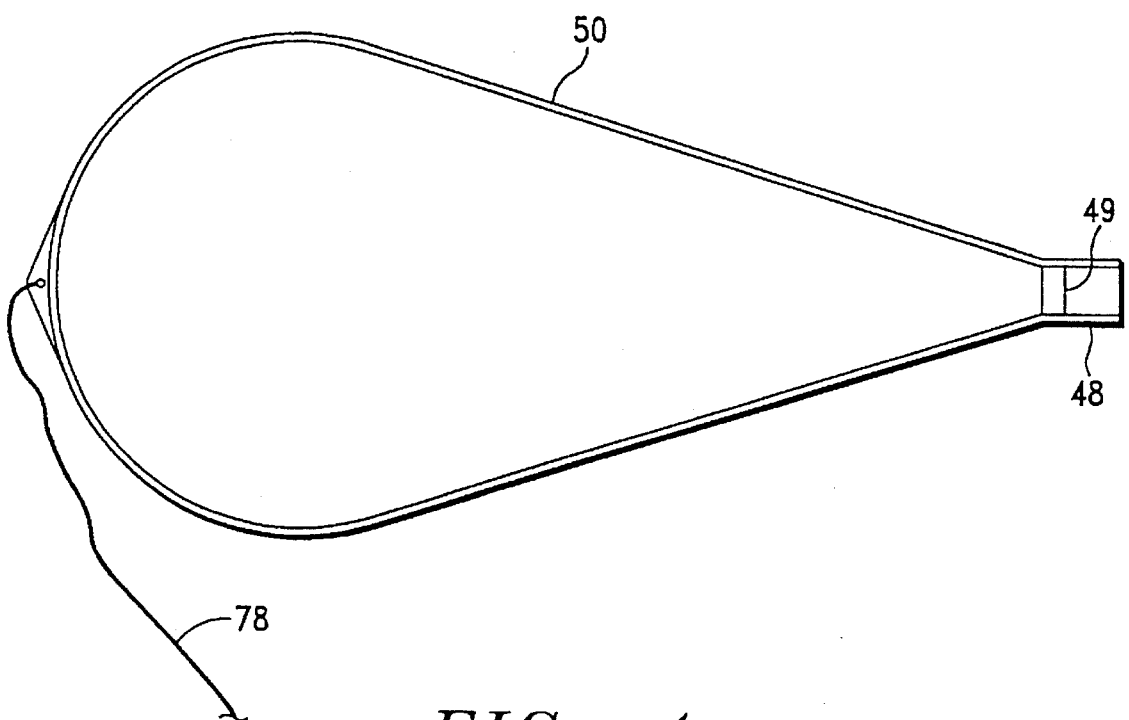
FIG. 4 is a cross-sectional side view of the balloon in inflated state.
Figure 5:
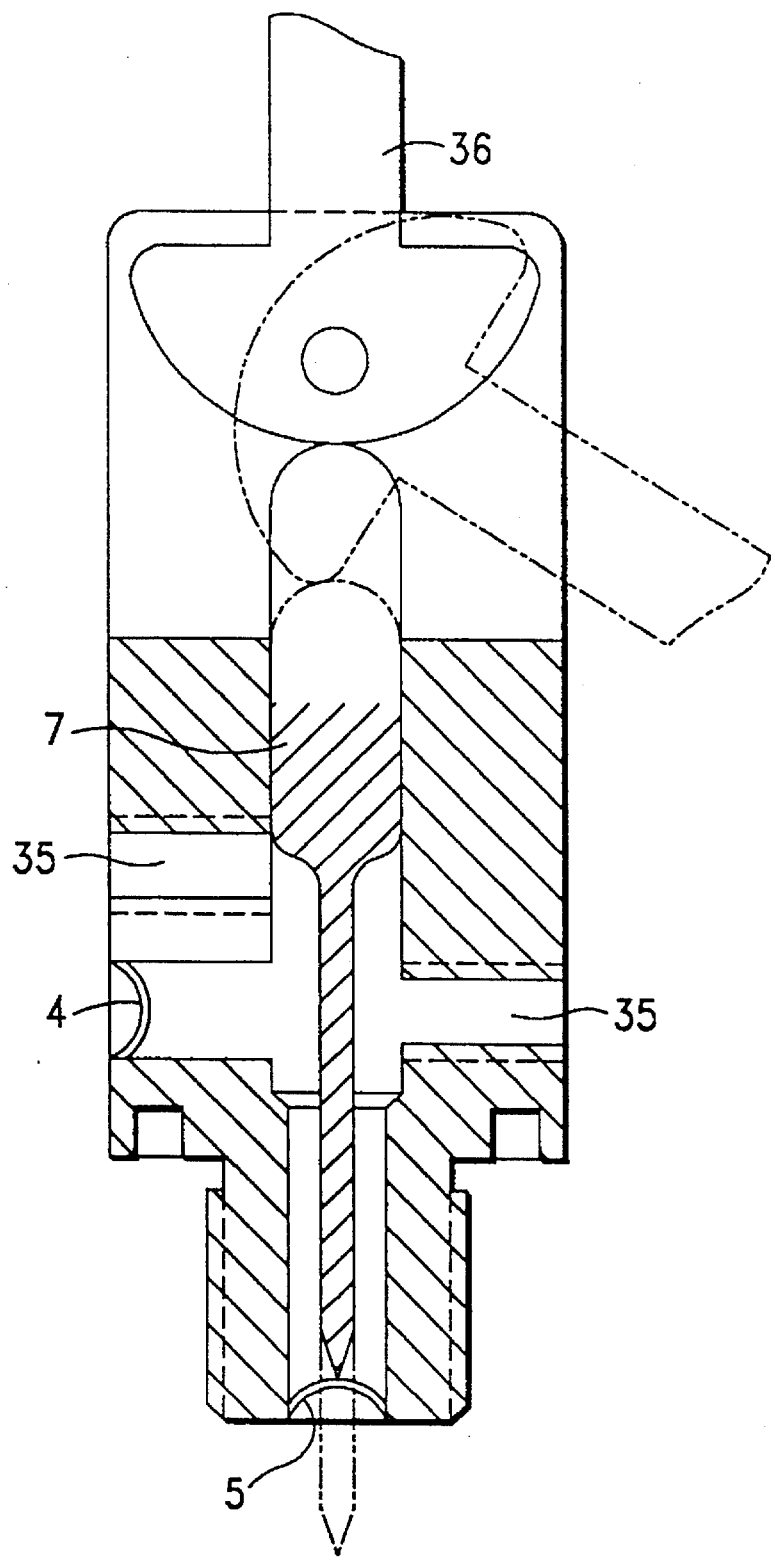
FIG. 5 is an exploded cross-sectional side view of the gas release actuator assembly.

Balloon signalling device 10 comprises a bottom pressure vessel 26 connected at its outlet end 28 to the inlet end 30 of gas release actuator assembly 32. Pivotally connected to gas release actuator assembly 32 is gas release lever arm 36. Gas outlet member 34 and outlet end 46 of gas release actuator assembly 32 is connected to the balloon filling tube 47, which is releasably connected to the balloon filler connector 48 of balloon bag 50 as shown in FIG. 2. A balloon release member 56 is releasably connected to balloon filling tube 47 and balloon filler connector 48 for detaching said balloon filling tube 47 from said balloon bag 50 when said balloon bag 50 is fully inflated. The balloon release member 56 is preferably a pressure-sensitive fitting, but can be any conventional connector or fitting used in pressurized gas applications, which can be easily disconnected manually, hydraulically, or mechanically and the like.

When assembled, bottom pressure vessel 26, top cap 16 and compression seal 68 are adapted to cooperate and provide a pressure tight seal to form said pressure resistant container 12. Compression seal 68 is preferably a seal of rubber or plastic and is adapted to fit around the top of bottom pressure vessel 26 and to frictionally engaged with the bottom of top cap 16. Top cap 16 is preferably adapted to be screwed onto gas release lever arm 36 (via threads 23 of sheath 37 which is attached to lever arm 36) through stud 18. Top cap 16 applies pressure to compression seal 68, thus providing a water-proof and and pressure-tight seal (preferably capable of withstanding about 60 pounds per square inch pressure; the approximate ambient pressure encountered by a diver at about 130 feet in sea water).

Sufficient space is provided under top cap 16 to provide for balloon bag 50 in its deflated and folded condition, as well as gas release actuator assembly 32, gas release lever arm 36, and tether spool 76 and tether line 78. Preferably a removable, flexible film 19 (comprised of plastic, rubber or paper) lines the inside of said top cap 16 and helps to protect the balloon bag 50 and gas release actuator assembly 32. Preferably a flexible film 17 (comprised of plastic, rubber or paper) lines the outside of gas release lever arm 36 and sheath 37 to protect the balloon bag 50.

Figure 6:
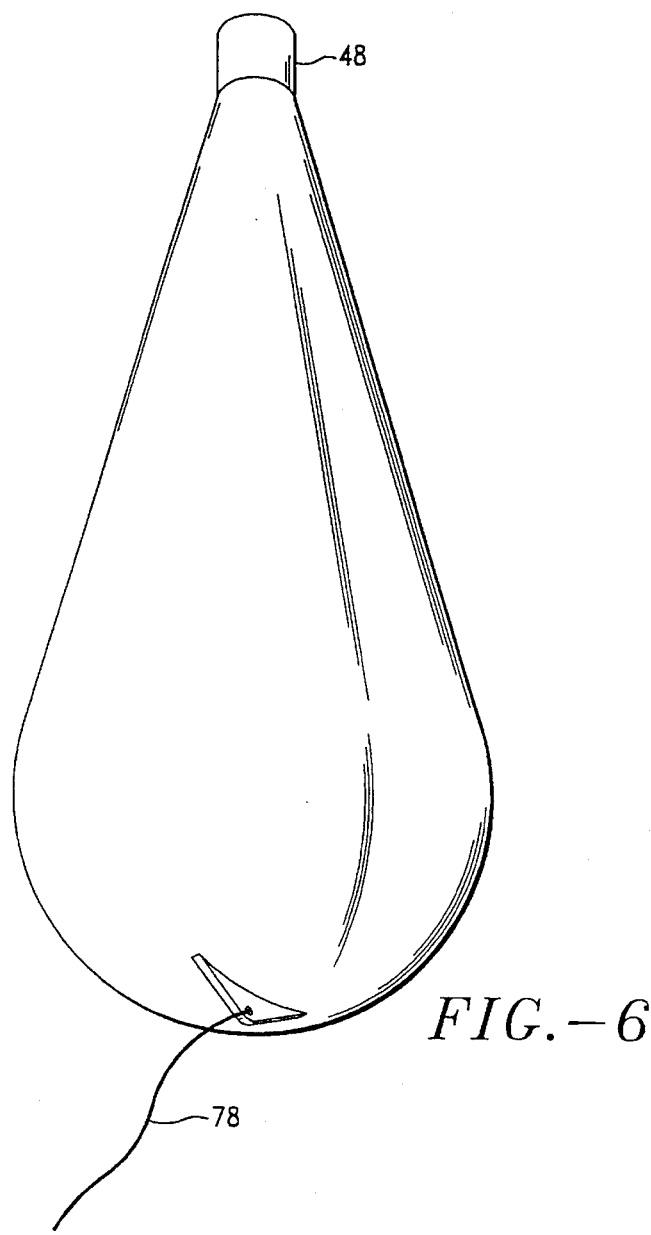
FIG. 6 is a perspective side view of the balloon in inflated state as it would float in non-windy atmospheric conditions.
Figure 7:
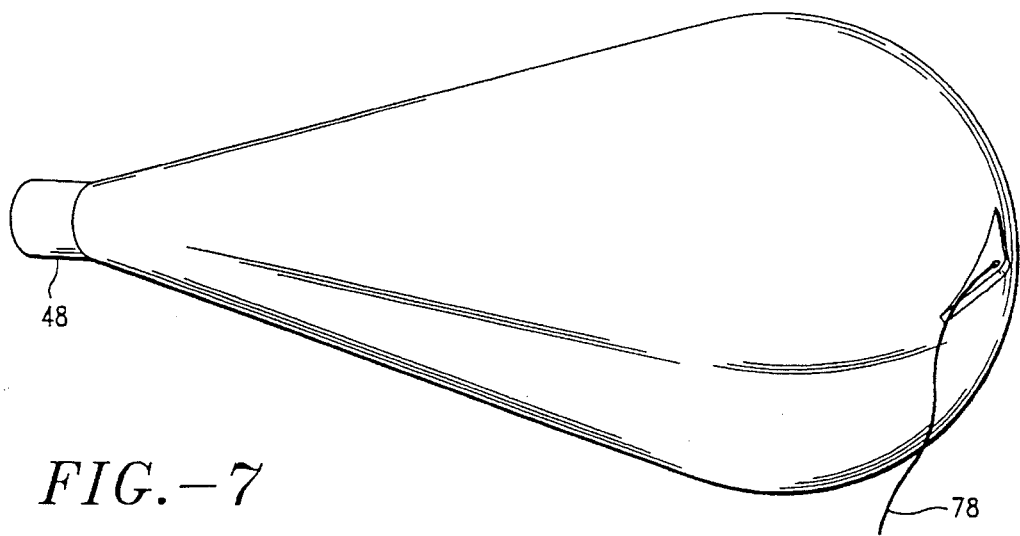
FIG. 7 is a perspective side view of the balloon in inflated state as it would float in windy atmospheric conditions.

Balloon bag 50 can be comprised of any relatively lightweight, gas-impermeable polymeric material, but is preferably comprised of a laminate of nylon on the outside and polyethylene on the inside of said balloon bag. The outside of balloon bag 50 may additionally comprise a reflective metal coating, such as aluminum and the like to give it a shiny metallic appearance, and is detectable visually or by radar when inflated and airborne. The balloon bag 50 has an airfoil configuration, preferably a substantially hemi-spherical shaped head portion and a substantially conical shaped tail portion when inflated such as shown in FIG. 6. The balloon bag 50 preferably has an interior volume of about 2 cubic feet or greater when inflated.

With reference to FIG. 1, balloon bag 50 is folded into cap 16. FIG. 1 also shows the position of the rotatable tether spool 76 containing tether line 78. Balloon tether spool 76 is journaled to tether spool axle 80. Tether spool axle 80 is attached to gas release actuator assembly 32. About 50 to 150 feet of tether line 78, preferably monofilament nylon, of about 5 to 15 pounds tensile strength are on the spool 76 with one end fixed to the tether spool 76 and the other end attached to the head portion of balloon bag 50.

Referring to FIG. 1, to operate balloon signalling device 10 after a SCUBA dive, the diver, carrying said device 10 attached to his or her diving belt or suit, preferably first rises to the surface of the water. By removing top cap 16 from pressure vessel 26 and removing protective film 19, the folded balloon bag 50 stored in top cap 16 is released and unfolds. The diver then grasps gas release lever arm 36 and sheath 37 and pulls or pushes them to pivot or rotate the gas release lever arm 36 about 90 degrees, thereby causing operating pin 7 to puncture primary disc 5. Lighter-than-air gas then flows out of pressure vessel 26; around pin 7; into expansion chamber 35; through regulator screw 33, outlet member 34, outlet end 46, balloon filler conduit 47, and balloon filler connector 48; and into balloon bag 50. When balloon bag 50 is fully inflated, preferably the balloon bag 50 is released via a balloon release member 56. Balloon release member 56 is preferably a pressure sensitive fitting which detaches the balloon filling tube 47 from the fully-inflated balloon bag 50 automatically or by the diver manually.

As the balloon filling tube 47 is disengaged, gas pressure from inside the balloon bag 50 pushes against and closes one-way valve 49 (preferably a duck-bill valve) to seal the balloon. As balloon bag 50 rises, tether line 78 is paid out from tether spool 76 until the full length of tether line 78 is reached.

Balloon bag 50 in its inflated state exhibits a low hydrodynamic drag profile such that the total form drag of the inflated balloon in a 15 miles-per-hour breeze is less than the net buoyancy of the balloon when the balloon is inflated with helium to a nominal pressure of 12 inches of water or greater. Thus, the inflated balloon will remain tethered and aloft in a moderate breeze.

Figure 8:
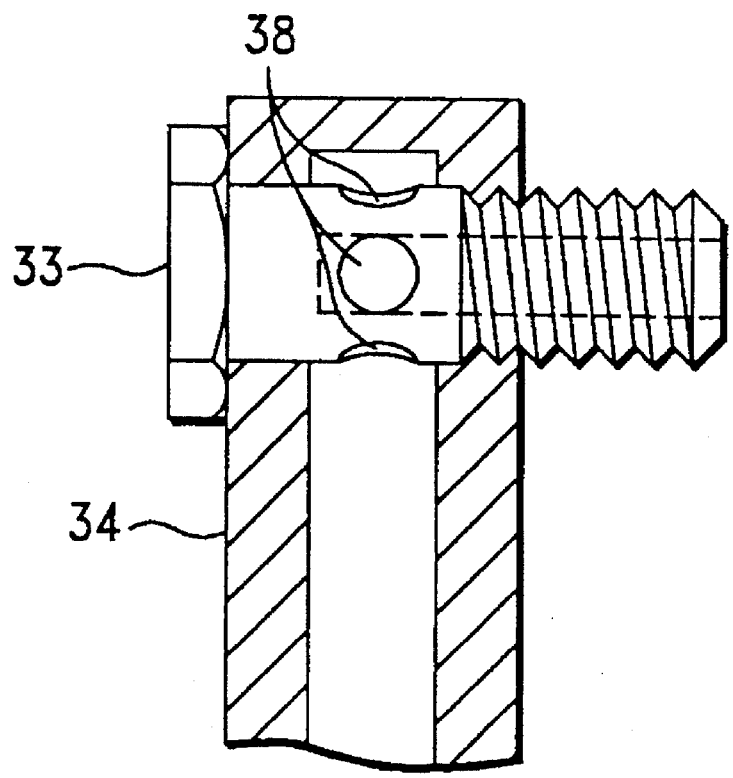
FIG. 8 is an exploded cross-sectional side view of gas outlet member and gas regulator screw.
Figure 9:
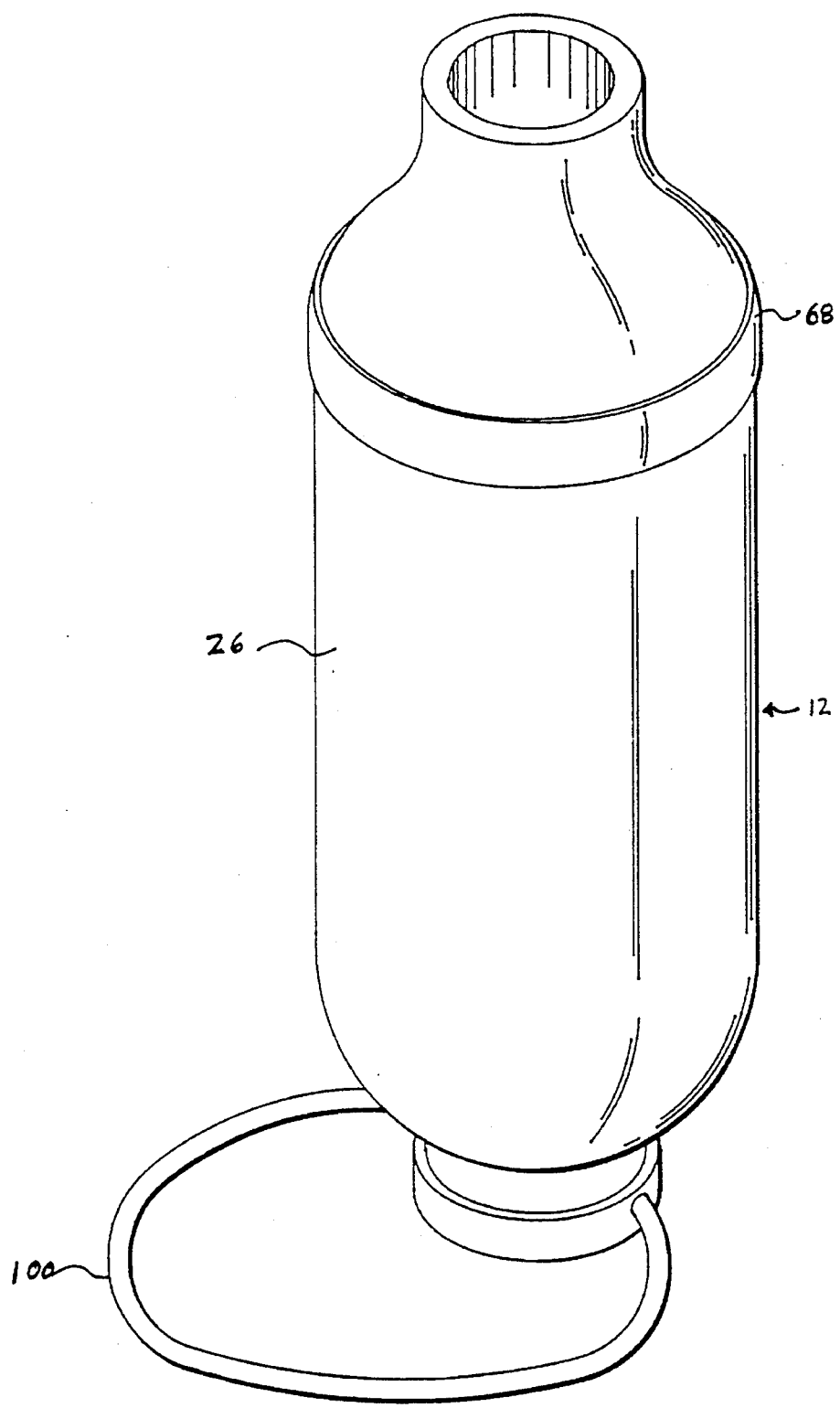
FIG. 9 is a perspective view of the pressure vessel.

The gas release actuator assembly 32 preferably incorporates welded metal diaphragms and crushed metal seals where used to contain the high pressure (i.e. 4500 psig) helium. Helium cannot be effectively sealed with elastomeric or polymeric seals. The primary disc 5 can be any of the conventional metallic rupture disc used in high pressure gas systems. The disc 5 is punctured by the operating pin 7, allowing high pressure gas to expand through the puncture hole into the expansion chamber 35. Pressure in the expansion chamber 35 forcibly retracts the operating pin 7, which then clears the puncture leaving a small venturi orifice through which the gas expands. This orifice is sized (i.e. about 0.001 to 0.003 inches) to function as a sonic nozzle which limits and regulates the flow rate of high pressure gas into the expansion chamber. In the operation of the venturi orifice gas velocity cannot exceed the velocity of sound in that gas. A shock wave forms as velocity in the orifice approaches the sonic limit that restricts flow. This allows a relatively constant volume (or constant mass flow) of gas to occur independent of the gas pressure in pressure vessel 26. Gas regulator screw 33 containing a substantially hollow interior and one or more outlet ports 38 (as shown in FIG. 8) can also be used to help regulate the flow of gas (by clockwise or counter-clockwise rotation) out of the expansion chamber 35 through gas outlet member 34 and into balloon bag 50. Preferably, the balloon filling tube 47 has a smaller inside diameter than the outlet end 46 of gas outlet member 34 of the gas release actuator assembly 32 to aid in regulating the flow of gas into balloon bag 50.

The primary rupture disc 5 and safety rupture disc 4 can be of similar construction. Preferably, pressure vessel 26 will rupture at about 7500 psig or greater. With normal storage pressure at about 4500 psig and at about 70 degrees F., the rupture pressure of about 7500 psig will be reached if the pressure vessel 26 exceeds approximately 900 degrees F. To prevent explosive rupture of the pressure vessel 26, the primary rupture disc 5 will preferably rupture at about 6000 psig and the safety rupture disc 4 will preferably-rupture at about 5000 psig. The cover seal 68 will release outward at a pressure inside sealed cap 16 of about 50 psig.

Should the balloon signalling device 10 be dropped in the water after inflating the balloon bag 50, the pressure vessel 26 and attachments will sink until the balloon bag 50 reaches the surface of the water. The inflated balloon bag 50 will provide excess buoyancy to keep the device afloat on the surface of the water. By locating the tether line 78, the diver can raise the pressure vessel 26 and attachments back to the surface and the balloon bag 50 again allowed to rise to its normal height above the surface of the water.

Charging the pressure vessel 26 or checking the pressure therein is preferably accomplished without disturbing the end containing the gas release actuator assembly 32. Preferably the pressure vessel 26 has a charging fitting 99 on the end opposite the gas release actuator assembly 32 for filling the vessel with helium or other lighter-than-air gas. This leaves the gas release actuator assembly 32 undisturbed during periodic filling and inspection of the pressure vessel 26 and can significantly improve reliability of the operation of the gas release actuator assembly and other components of the balloon signalling device of the invention. A safety and attachment lanyard 100 is preferably secured to the end of pressure vessel 26 containing the charging fitting. This lanyard 100 can be secured to the diver or any other object to prevent the signalling device from becoming separated from the diver or object.

A secondary means of verifying gas pressure in the pressure vessel 26 is by measuring the resonant frequency or tone of the vessel when suspended and tapped like a bell. The tensile stress in the vessel wall will increase the resonant frequency of the vessel when it is suspended and tapped. The tone or frequency is a function of the tension in the wall of pressure vessel 26, which is directly related to internal (or differential) pressure across the vessel wall. When the pressure vessel is properly filled, the vessel should be suspended and tapped and the resonant frequency recorded. A later lowering of the resonant frequency indicates leakage and loss of internal pressure.

As can be seen by the foregoing specification, the balloon signalling device 10 of the present invention provides a reliable and positive method of inflating and releasing a distress balloon signal. The invention includes the embodiments as described and exemplified herein as well as equivalent embodiments.

What is claimed is:

1. An inflatable balloon signalling device comprising:

a bottom pressure vessel having an outlet end and containing a lighter-than-air gas under pressure;

a top cap removably connected to said bottom pressure vessel to form a water-tight seal there between, said top cap and bottom pressure vessel in combination forming a pressure-resistant container;

an inflatable balloon bag having a balloon filler connector, said balloon bag having an airfoil configuration when inflated;

a gas release actuator assembly housed within said pressure-resistant container, and having an inlet end connected to said pressure vessel and an outlet end adapted to receive a balloon filling tube, and being in open communication with said balloon bag and said pressure vessel;

said balloon filing tube attached to said outlet end of said gas release actuator assembly and releasably attached to said balloon filler connector via a balloon release member;

a gas release lever arm pivotally connected to said gas release actuator assembly and adapted to release lighter-than-air gas from said pressure vessel when said gas release lever arm is rotated; and a rotatable spool mounted in proximity to said gas release actuator assembly and having a tether line connected to said rotatable spool and said balloon bag;

wherein said top cap is removably connected to said bottom pressure vessel by attachment of a threaded stud on said top cap to said gas release lever arm.

2. The balloon signalling device of claim 1 wherein said bottom pressure vessel contains a compression seal around said bottom pressure vessel in frictional engagement with said top cap.

3. The balloon signalling device of claim 1 wherein said pressure vessel contains a rupture disk in its outlet end, and said gas release actuator assembly contains an operating pin adapted to puncture said rupture disk to form an orifice therein when said gas release lever arm is rotated about 90 degrees.

4. The balloon signalling device of claim 3 wherein said orifice has a diameter of about 0.001 inches to about 0.003 inches and functions as a sonic nozzle which regulates the flow rate of said lighter-than-air gas from said pressure vessel.

5. The balloon signalling device of claim 1 wherein said balloon bag has a substantially hemi-spherical shaped head portion and a conical shaped tail portion when inflated.

6. The balloon signalling device of claim 5 wherein said balloon bag has an interior volume of about at least 2 cubic feet when inflated.

7. The balloon signalling device of claim 1 wherein said balloon bag is comprised of a laminate of nylon on the outside and polyethylene on the inside of said balloon bag.

8. The balloon signalling device of claim 1 wherein said balloon filling tube has a smaller diameter than the diameter of said outlet end of the gas release actuator assembly.

9. The balloon signalling device of claim 1 wherein said balloon release member is a pressure-sensitive fitting.

10. The balloon signalling device of claim 1 wherein said balloon filler connector contains a one-way valve which permits said lighter-than-air gas to flow into said balloon bag.

11. The balloon signalling device of claim 10 wherein said one-way valve is a duck-bill valve.

12. The balloon signalling device of claim 1 wherein said top cap contains a removable flexible film lining the inside of said top cap.

13. The balloon signalling device of claim 1 wherein said bottom pressure vessel contains a charging fitting opposite said outlet end.

\* \* \* \* \*